United States Patent [19]
Gabel

[11] Patent Number: 5,930,504
[45] Date of Patent: Jul. 27, 1999

[54] DYNAMIC NONVOLATILE MEMORY UPDATE IN A COMPUTER SYSTEM

[75] Inventor: Douglas L. Gabel, Hillsboro, Oreg.

[73] Assignee: Intel Corporation, Santa Clara, Calif.

[21] Appl. No.: 08/686,170

[22] Filed: Jul. 22, 1996

[51] Int. Cl.$^6$ .................................................. G06F 9/06
[52] U.S. Cl. ........................................ 395/652; 395/712
[58] Field of Search ................................. 395/651, 652, 395/653, 712, 200.5, 200.51, 200.52

[56] References Cited

U.S. PATENT DOCUMENTS

| | | |
|---|---|---|
| 4,153,937 | 5/1979 | Poland . |
| 4,290,104 | 9/1981 | Holtey et al. . |
| 4,374,417 | 2/1983 | Bradley et al. . |
| 4,441,155 | 4/1984 | Fletcher et al. . |
| 4,443,847 | 4/1984 | Bradley et al. . |
| 4,590,557 | 5/1986 | Lillie ........................................ 395/652 |
| 4,608,632 | 8/1986 | Kummer . |
| 4,763,333 | 8/1988 | Byrd . |
| 4,799,145 | 1/1989 | Goss et al. . |
| 4,831,522 | 5/1989 | Henderson et al. . |
| 4,862,349 | 8/1989 | Foreman et al. . |
| 5,034,915 | 7/1991 | Styrna et al. . |
| 5,053,990 | 10/1991 | Kreifels et al. . |
| 5,117,492 | 5/1992 | Nash . |
| 5,126,808 | 6/1992 | Montalvo et al. . |
| 5,134,580 | 7/1992 | Bertram et al. . |
| 5,136,713 | 8/1992 | Bealkowski et al. . |
| 5,142,680 | 8/1992 | Ottman et al. . |
| 5,210,875 | 5/1993 | Bealkowski et al. . |
| 5,257,380 | 10/1993 | Lang . |
| 5,295,263 | 3/1994 | Kojima et al. ........................... 395/650 |
| 5,371,876 | 12/1994 | Ewertz et al. . |
| 5,388,267 | 2/1995 | Chan et al. . |
| 5,430,878 | 7/1995 | Straub et al. ............................. 395/651 |
| 5,437,018 | 7/1995 | Kobayashi et al. ...................... 395/652 |
| 5,450,589 | 9/1995 | Maebayashi et al. ................... 395/712 |
| 5,473,775 | 12/1995 | Sakai et al. .............................. 395/653 |
| 5,497,492 | 3/1996 | Zbikowski et al. ...................... 395/652 |
| 5,566,335 | 10/1996 | Nash et al. .............................. 395/651 |

OTHER PUBLICATIONS

Jex, Jerry, "Flash Memory BIOS for PC and Notebook Computers", *IEEE*, 1991, pp. 692–695.

Glass, Brett, "The IBM PC BIOS", *Byte*, Apr. 1989, pp. 303–310.

Levy, Markus A., "Designing With Flash Memory: Is There a New Alternative to EPROM and SRAM?", *Circuit Cellar Ink*, Dec. 1990/Jan. 1991, pp. 50–58.

Machrone, Bill, "Bill Machrone: Changes in the Microcomputer Market", *PC Magazine*, Apr. 10, 1990, vol. 9, No. 7, p. 67 (2 pgs).

(List continued on next page.)

*Primary Examiner*—Kevin A. Kriess
*Attorney, Agent, or Firm*—Blakely, Sokoloff, Taylor & Zafman

[57] ABSTRACT

An improved process for updating a nonvolatile memory of a computer system includes selecting a logical area of the nonvolatile memory to update. Protected procedures are copied from one of the selected logical area and an update file. Information from the update file is copied to the nonvolatile memory in accordance with the copied protected procedures. Another method of updating the nonvolatile memory includes selecting at least a portion of the nonvolatile memory to update. Protected procedures including an updated memory map are copied from an update file. Information from the update file is copied to the nonvolatile memory in accordance with the copied protected procedures. An update file to facilitate the improved update processes includes a header section and a update information section. The update information section includes updated code and data for the nonvolatile memory. The header includes a code usage indicator, and offsets to an update table and protected procedures in order to facilitate the update process. The code usage indicator indicates whether the protected procedures are copied from the update file or the nonvolatile memory. The offsets locate the update table and the protected procedures within the update file so that they can be copied to the system memory for use during the update process.

35 Claims, 4 Drawing Sheets

OTHER PUBLICATIONS

Shandle, Jack, "Laptop Vendors Join the Flash Bandwagon", *Electronics*, Nov. 1990, cover page, pp. 6 and 52–53.

Venditto, Gus, "Intel's Flash Memory Poised to Give Laptops Their Next Great Leap", *PC Magazine*, Aug. 1990, vol. 9, No. 14, p. 63 (3 pgs).

Venditto, Gus, "Trends Shaping Microcomputer Market", *PC Magazine*, Feb. 13, 1990, vol. 9, No. 3, p. 63 (3 pgs).

Waite, Mitchell & John Angermeyer, *CP / M Bible: The Authoritative Reference Guide to CP / M*, Howard W. Sams & Co., Inc., 1983, pp. 5 –22 (Table of Contents) and 100.

Waite, Mitchell & Robert Lafore, *Soul of CP / M*, The Waite Group, Inc., 1983, pp. 2, 7–10 (Table of Contents), 177–182 and 277–322.

Wharton, John H., "Flash! Memory Technology Marches On", *Microprocessor Report*, Aug. 8, 1990, vol. 4, No. 13, p. 16 (4 pgs.).

Weber, Samuel, "Look Out EPROM's, Here Comes Flash", *Electronics*, Nov. 1990, cover page, pp. 6 and 44, 46 & 50.

DYNAMIC NONVOLATILE MEMORY UPDATE IN A COMPUTER SYSTEM

FIELD OF THE INVENTION

This invention relates to the field of computer memories. In particular, this invention is drawn to methods and apparatus for updating nonvolatile memories.

BACKGROUND OF THE INVENTION

Some computer systems use nonvolatile memory devices for the storage of firmware. From time to time, the firmware needs to be updated in order to accommodate new devices, configurations, or capacities for the computer system. The firmware also needs to be updated in order to fix errors in the current version of the firmware.

One example of a computer system is the IBM Personal Computer (PC) system developed by IBM Corporation of Armonk, N.Y. Some variations of the IBM PC store firmware including the basic input/output system (BIOS) in nonvolatile memory. The BIOS includes data and instructions so that the operating system can access the hardware and other resources of the computer system. An upgrade to the BIOS might be necessary for any number of reasons.

One reason the BIOS may need to be upgraded is to accommodate changes in configuration of the computer system. For example, the BIOS might need to be upgraded in order to support a new peripheral. Thus installing a disk drive that has a substantially greater capacity than what was allowed for in the current version of the BIOS may require an update to the BIOS. Another reason the BIOS may have to be upgraded is to support a device not provided for in the current version of the BIOS. Another reason for updating the BIOS is to correct errors in the current version of the BIOS.

In order to replace, modify, or update firmware in such a computer system, the nonvolatile memory device has to be replaced or reprogrammed depending upon the type of nonvolatile memory used to store the firmware. The various types of nonvolatile memory devices used to store firmware include read only memory (ROM), programmable read only memory (PROM), and erasable programmable read only memory (EPROM).

For some computer systems the replace or reprogram operation requires invasive procedures. For example, replacement might require removing a portion of the computer housing and disconnecting a ROM device. Disconnecting the ROM device might even require desoldering the ROM device from the system board.

Alternatively, even if the nonvolatile memory device is reprogrammable, some types of nonvolatile memory require resources such as ultraviolet light or voltages which are not ordinarily provided within the typical computer system in order to accomplish the reprogramming operation. Thus, even though the nonvolatile memory is reprogrammable, the nonvolatile memory might have to be removed, reprogrammed, and then subsequently placed back into the computer system in order to accomplish the update procedure.

One type of nonvolatile memory used for storing firmware is flash electrically erasable programmable read only memory (flash EEPROM). The use of flash memory permits non-invasive updating procedures so that the nonvolatile memory can be updated from an update file.

The nonvolatile memory is typically organized into logical areas. The memory mapping of these areas is also stored within the nonvolatile memory. A memory update program (MUP) can be used to update a selected logical area. A MUP obtains the logical area memory mapping from the nonvolatile memory. A user selects the logical area to be updated by MUP. The selected logical area is erased. The selected logical area is then reprogrammed by copying a memory data image from an update file into that logical area. The memory data image is the updated version of the selected logical area.

One disadvantage of this technique is that sections cannot be added or substantially altered in size. The nonvolatile memory logical areas adhere to a memory mapping that updates must also follow. The processor retrieves an exact image of the logical area to be replaced or upgraded from the update file. Thus there must be a one-to-one correspondence between the logical areas before the update and the logical areas after the update. The ability to update the nonvolatile memory is constrained by the memory mappings defined by the current contents of the nonvolatile memory.

As a result of the inability to change size or number of logical areas, the location of various components of the firmware cannot be relocated using the update process described above. For example, the update process may not be able to install an updated BIOS that is larger or located in a different position within the nonvolatile memory than the currently installed version of the BIOS. Thus future versions of BIOS are constrained by limitations placed upon the currently installed version of the BIOS.

Given that computer systems may have different memory mappings for their firmware, distinct memory data images may be required for the logical areas defined by the current version of the firmware in each computer system. This may require distribution of separate update files for each type of computer system, for example, whenever an updated BIOS becomes available. In other words, for each version of BIOS generated a number of different update files must be created to accommodate updating a variety of computer systems in accordance with their distinct memory maps.

Thus a number of disadvantages result because of the dependency placed upon the current contents of the nonvolatile memory for information about the updates to the nonvolatile memory.

SUMMARY OF THE INVENTION

In view of limitations of known systems and methods, one desire is to provide an improved nonvolatile memory update process that decreases the dependency of a future upgrade upon the current contents of the nonvolatile memory.

Another desire is to provide an improved nonvolatile memory update process to help reduce the number of variations of an update file previously required to accommodate updating a variety of computer systems.

A method of updating a nonvolatile memory in a computer system is described. A logical area of the nonvolatile memory is selected to update. Protected procedures are copied from one of the selected logical area and an update file. Information from the update file is copied to the nonvolatile memory in accordance with the copied protected procedures.

Another method of updating a nonvolatile memory in a computer system is described. At least a portion of the nonvolatile memory is selected to be updated. Protected procedures including an updated memory map are copied from an update file. Information from the update file is copied to the nonvolatile memory in accordance with the copied protected procedures.

The update file includes a header section and a update information section. The update information section includes updated code and data for the nonvolatile memory. The header includes a code usage indicator, and offsets to an update table and protected procedures in order to facilitate the update process. The offsets point to protected procedures within the update file for use during the upgrade process.

Other desires, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
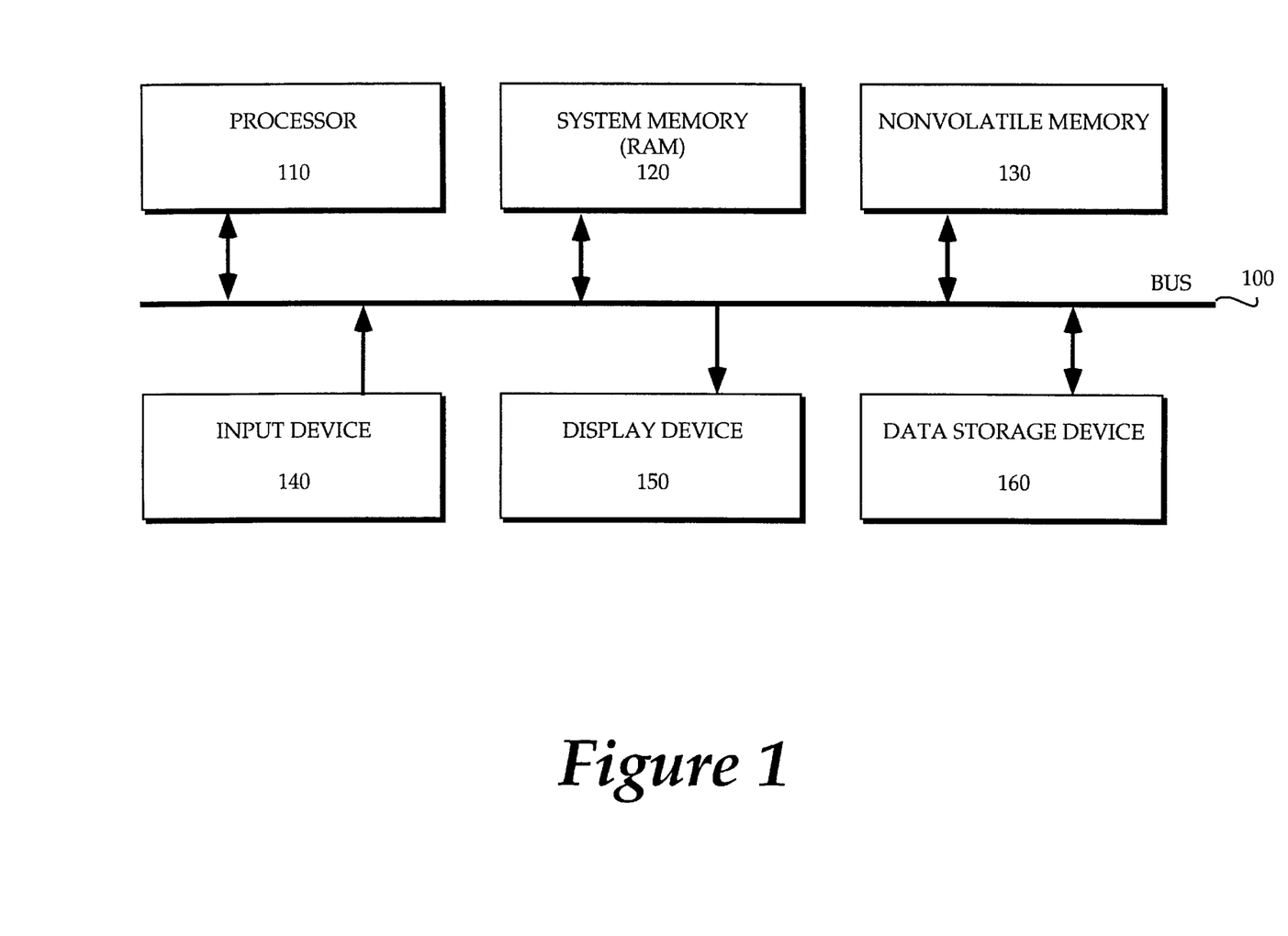
FIG. 1 illustrates components of a computer system.

FIG. 1 illustrates various components of a computer system. Processor 110 is coupled to system memory 120. System memory 120 typically includes random access memory (RAM). Firmware such as BIOS is stored in nonvolatile memory 130. Input device 140 is used by the user to communicate information and commands to processor 110. Display device 150 displays information for a computer system user. Data storage device 160 stores instructions and data for use by processor 110. Information is communicated between processor 110 and the other components using system bus 160.

In one embodiment, nonvolatile memory 130 is a flash electrically erasable programmable read only memory (flash memory). Some flash memory devices only permit complete erasure and reprogramming of all memory locations within the device. Other flash memory devices are partitioned into blocks that can be individually erased and reprogrammed. This latter type of flash memory can be referred to as block erasable flash memory.

Figure 2:
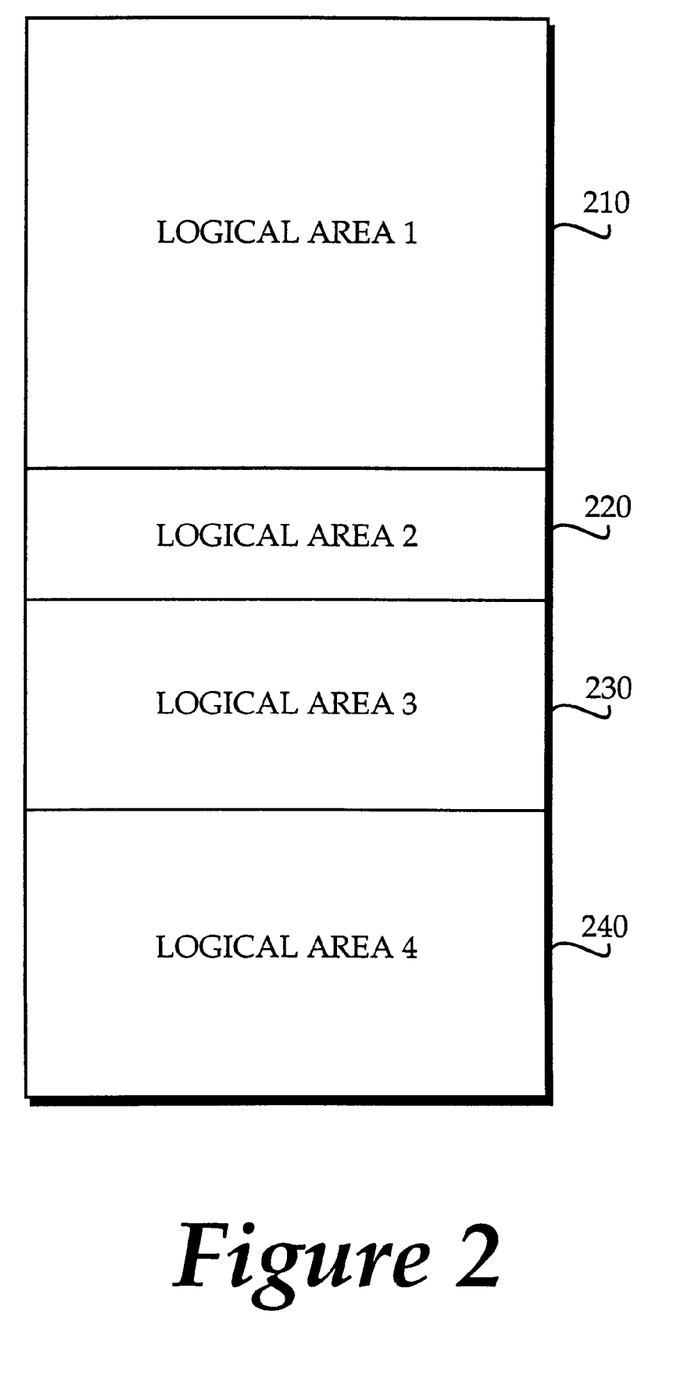
FIG. 2 illustrates one embodiment of a memory map for the nonvolatile memory

FIG. 2 illustrates one embodiment of a memory map for nonvolatile memory 130. In the illustrated embodiment, the nonvolatile memory is logically divided into four logical areas (210, 220, 230 and 240). The four logical areas are not the same size. In alternative embodiments, however, there can be more or fewer than four logical areas. In these alternative embodiments, the logical areas can be the same size or of varying sizes.

Firmware, such as BIOS, is located in some portion of the nonvolatile memory. In other words, the BIOS is located in at least one of the four logical areas. Thus for example, the BIOS might be located in Logical Area 1 (210) in one embodiment. In an alternative embodiment, the BIOS may extend across multiple logical areas so that the BIOS is stored in Logical Area 2 (220) and Logical Area 3 (230), for example.

In order to update the nonvolatile memory, a memory update program (MUP) is used. The memory update program permits the user to select the areas to be updated and the source of the update information. Typically, the update information is stored within an update file. The update file resides on storage media accessible to the processor such as compact disk, floppy disks, or a hard drive.

One method of updating the nonvolatile memory involves copying the update information from the update file to the appropriate logical area. The update file includes a memory data image which is copied from the update file to the nonvolatile memory during the update process. Although the update information might include updated versions of code including code used during the update process, the memory data image is treated merely as data to be copied into the nonvolatile memory using current versions of the code.

The use of this technique is described in application Ser. No. 08/505,995 of Christeson, et al. filed on Jul. 24, 1995, which is a continuation of application Ser. No. 08/135,310 filed on Oct. 12, 1993, which is a continuation of application Ser. No. 07/695,952 filed on May 6, 1991. Christeson describes general nonvolatile memory maintenance processes including recovery, verification, save to file, and update procedures for the contents of a nonvolatile memory using the memory data image technique.

In order to update a logical area, update procedures that are not residing in that logical area must be used. If the update procedures were executed from a logical area being updated, those procedures could be changed or corrupted by the update procedure. In some computer systems, the update procedures are stored in each updatable logical area, however, the update procedures are copied to a safe system memory location specified by the memory update program for execution. In one embodiment, the system memory is random access memory (RAM). Executing the procedures from system memory allows them to be protected from the update process which would otherwise corrupt them if they were executed from the logical area currently being overwritten. These update procedures are referred to as protected procedures.

Protected procedures include the erase and programming procedures for the nonvolatile memory. The erase and programming procedures are specific to the logical area they are stored in. Thus a given logical area has procedures stored in it for updating the given logical area and no other area. Because the protected procedures are specific to the logical area they are stored in, information as to future updates is limited to the current contents of the nonvolatile memory.

Protected procedures may also include an exit procedure for exiting the update process. This helps to ensure a graceful exit from the update process in the event of an error during the update process. Such an error, for example, may be due to a brief power loss or a defective nonvolatile memory.

The protected procedures must also define the area to be updated. Thus the protected procedures include a memory map of the nonvolatile memory. This memory map can be obtained from the nonvolatile memory and stored in system memory for use during the update process.

One disadvantage that follows from using protected procedures from the logical areas themselves is the inflexibility in changing the size of the logical areas. The mapping of the nonvolatile memory, for example, might be defined by the currently installed BIOS. Thus the user may not be able to alter the number or size of the logical areas, if such capability was not provided for in the installed version of BIOS. Furthermore, the user could not upgrade to a version of the BIOS that permitted such a capability, if the upgrade version of the BIOS required more memory than currently allocated for a given logical area or was otherwise incompatible with the mapping defined by the current version of the BIOS.

Ideally, the number of logical areas and the size of the logical areas should be variable as long as the number and size of logical areas does not exceed the extent of the nonvolatile memory or the extent of the nonvolatile memory allocated for BIOS.

Another disadvantage of using protected procedures from the logical areas themselves is the dependency upon the installed version of the BIOS for information about the future version of the BIOS.

The location of the BIOS, the information stored in the other logical areas, and the size of the logical areas can vary from computer system to computer system. This means that a variety of memory data images must be available to take care of the variety of system configurations. Using the aforementioned memory data image technique may entail creating a number of update files for each upgrade revision due to the inherent dependency of the upgrade process upon the pre-existing configuration (e.g., memory map) of the nonvolatile memory. In other words, the memory data image is unique for a particular computer system configuration and thus a number of memory data images must be created for a given upgrade revision in order to accommodate the variety of system configurations.

The use of update code (including protected procedures) from a source other than the current contents of the nonvolatile memory can overcome many of these disadvantages. In particular, an improved update file format includes update data, re-mapping tables, and update code to be used for the current update. Instead of merely transferring a binary image from a file, the update process obtains the protected procedures from the update file, if necessary, rather than the nonvolatile memory. This permits flexibility in updating the nonvolatile memory with respect to BIOS, for example, because each new version of the BIOS does not necessarily need to conform to limitations imposed by the currently installed version of the BIOS.

Figure 3:
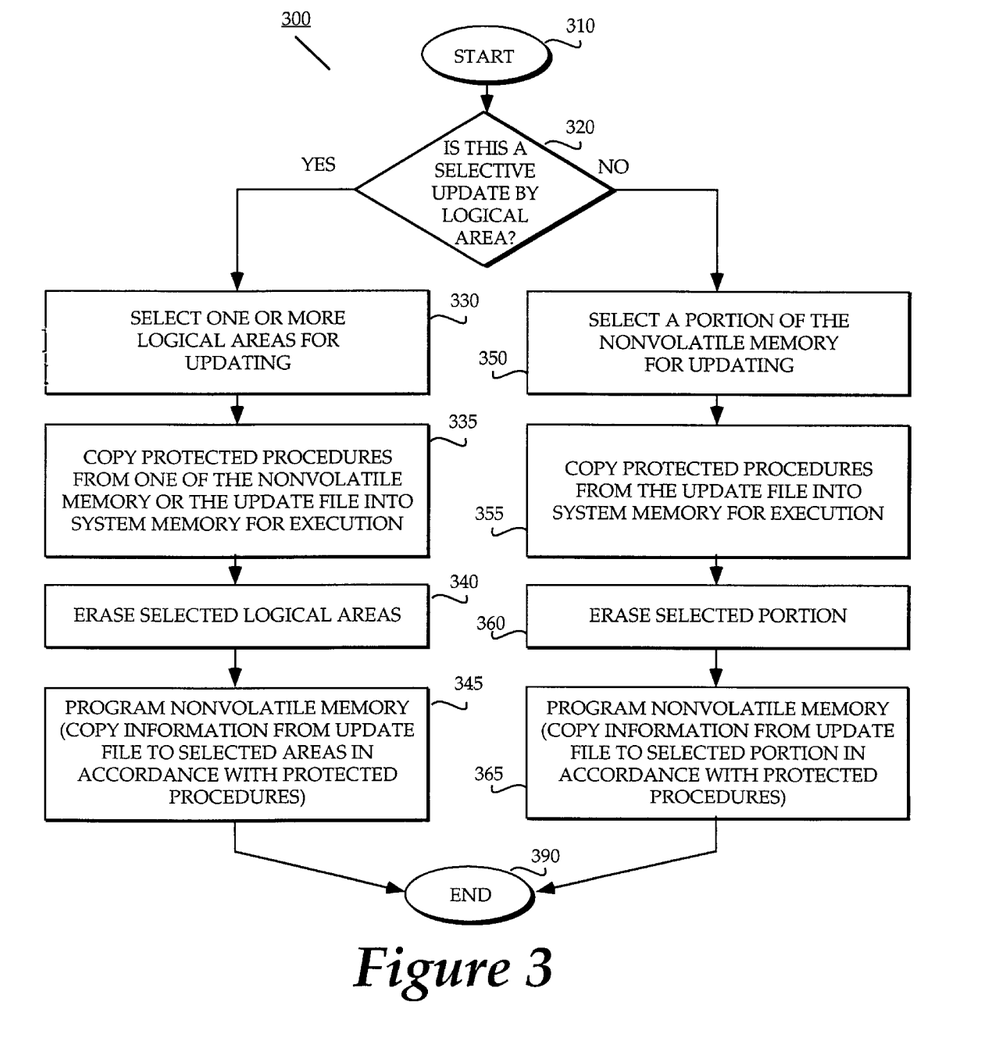
FIG. 3 illustrates a flowchart for the nonvolatile memory update process.

FIG. 3 illustrates a flowchart for one embodiment of a process for updating the nonvolatile memory. In one embodiment, the update process is performed by the processor in accordance with a nonvolatile memory update program executing on the processor. For flash nonvolatile memories the program is referred to as the flash memory update program (FMUP).

The update process 300 effectively begins at step 310. The update process is dependent upon whether logical areas are to be explicitly selected for updating or whether the user would like to update the nonvolatile memory in accordance with the update file regardless of the correspondence between logical areas before and after the update process. Thus, in step 320 a determination is made as to whether this is a selective update (i.e., are logical areas to be explicitly selected for update?). If so, then the update process proceeds with the selective update process of steps 330–390.

In step 330, one or more logical areas are selected for updating. In one embodiment, this is accomplished by explicitly identifying the logical areas to be updated. The user might provide this information to the processor through a menu selection or from a file accessible to the processor.

Once the areas to be updated have been selected, the selective update process continues with step 335. In step 335, the protected procedures are copied from one of the nonvolatile memory or the update file into system memory for execution. The user may be required to identify the update file to the processor. In one embodiment, the user will provide the identity and location of an update file. The identity and location of the update file could be provided to the processor using the input device in response to a prompt, for example. In an alternative embodiment, the user is required to provide an update file at a predetermined location with a predetermined name. Step 335 inherently includes a determination as to whether the protected procedures should be obtained from the nonvolatile memory or the update file. If a protected procedure is to be obtained from the update file, the protected procedure is copied to system memory for execution. If a protected procedure is to be obtained from the nonvolatile memory, the protected procedure is copied from the nonvolatile memory to the system memory for execution.

After the protected procedures have been copied, the selected logical areas are erased by erasing the portions of the nonvolatile memory corresponding to the selected logical areas in step 340. After erasure, the logical areas can be reprogrammed with the updated information.

In step 345, the nonvolatile memory is programmed by copying update information from the update file to the selected logical area(s) in accordance with the protected procedures. Thus the selected logical area(s) are updated. The selective update process is then completed in step 390.

Returning to step 320, if the user desires to update the nonvolatile memory without explicitly selecting logical area (s), then the update process proceeds to step 350. This might be the case, for example, if the user desires to update specific contents (such as the BIOS) without regard to which logical areas the BIOS is stored in. In this case, the content specific portions are selected to be updated without regard to any correspondence with logical areas. Alternatively, the user might desire to update any and all portions of the nonvolatile memory that can be updated with the update file. In this case, all the updatable portions of the nonvolatile memory are selected either explicitly or by default without regard to a correspondence between the portion to be updated and logical areas. This may be particularly useful, for example, if the update file provides for a different number of logical areas or a change in size of the logical areas. Thus in step 350 at least a portion of the nonvolatile memory will be selected for updating regardless of whether the portion to be updated includes all updatable portions or content specific portions of the nonvolatile memory.

As an aside, the nonvolatile memory might have areas that cannot be physically updated. In particular, the nonvolatile memory may have areas reserved for recovery procedures in the event that a failure occurred while updating the nonvolatile memory. Such areas may be limited to read-only to ensure that the user can reboot the computer and re-initiate upgrading or reinstalling the BIOS. Otherwise, if a power failure occurred while upgrading areas of the nonvolatile memory storing recovery procedures, the user might not be able to reboot the computer to a recoverable state.

The update process continues with step 355 after a portion of the nonvolatile memory has been selected for updating. In step 355, the protected procedures are copied from the update file into system memory for execution.

After the protected procedures have been copied, the selected logical areas are erased by erasing the portions of the nonvolatile memory corresponding to the selected portion(s) in step 360. After erasure, the nonvolatile memory can be reprogrammed with the updated information.

After erasure, the selected portion(s) can be programmed with the updated information. The nonvolatile memory is programmed in step 365 with update information copied from the update file in accordance with the protected procedures residing in the system memory. After the nonvolatile memory has been updated the update process finishes in step 390.

In summary, one or more logical areas are selected as the targeted update area(s) (i.e., the selected section(s) to update), if the selective update mode is chosen. Otherwise, one or more portions of the nonvolatile memory are selected as the selected section to update if the selective update mode is not chosen. Protected procedures are then copied from one of the nonvolatile memory and the update file into system memory for execution. Next, the selected section of the nonvolatile memory is erased. Finally, the update information from the update file is copied to the nonvolatile memory in accordance with the protected procedures.

In one embodiment the update file is physically stored as a series of chained files. In such an embodiment, steps 345 and 365 include determining whether the update file currently being copied from is the last file in the chain of files. If not, the copying process continues with the next file in the chain until the last file in the chain has been processed.

Figure 4:
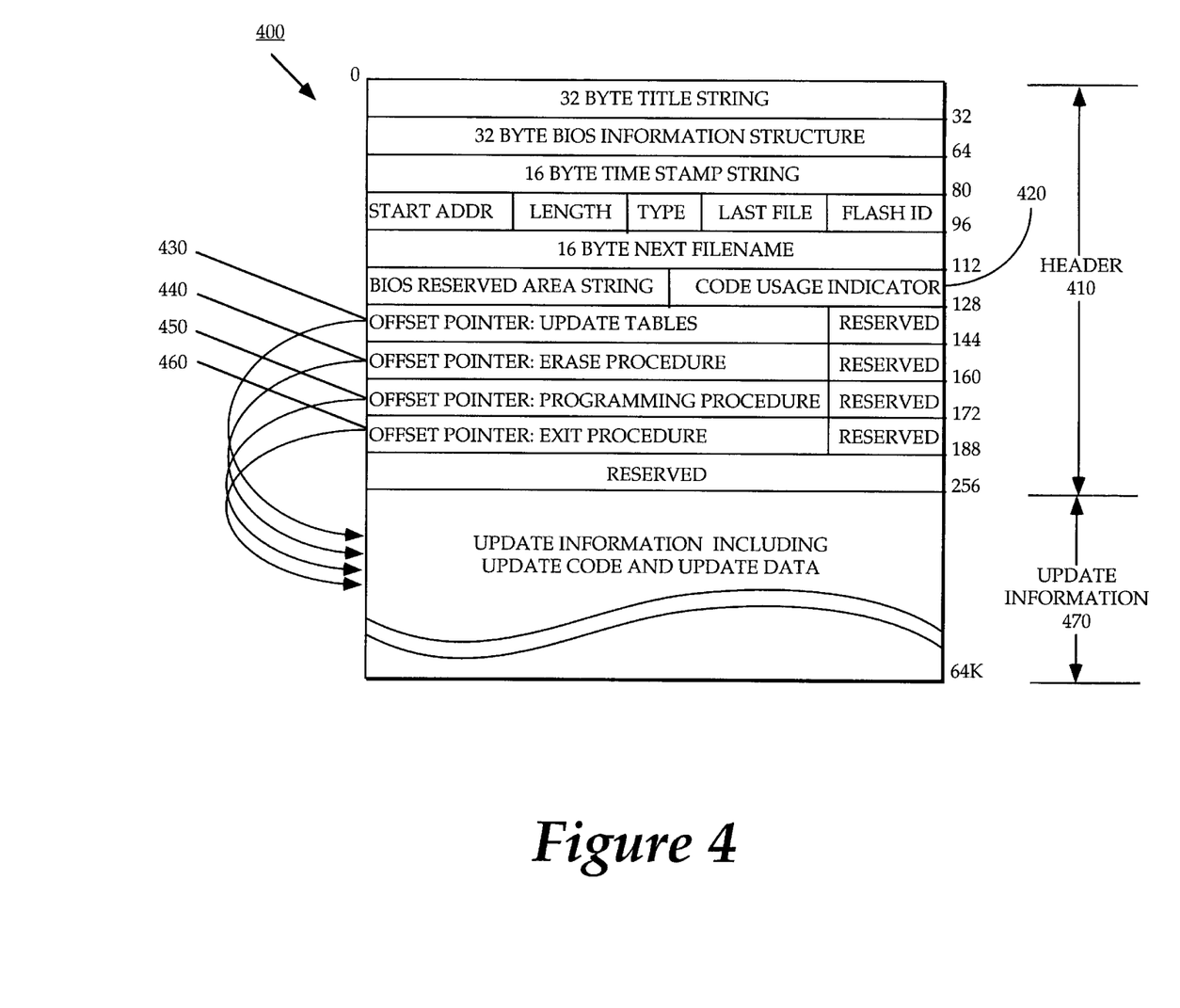
FIG. 4 illustrates one embodiment of a file structure for the update file used in the improved nonvolatile memory update process.

FIG. 4 illustrates one embodiment of a file structure for the update file. Update file 400 includes a header 410 and the update information 470. Update information 470 includes update code and update data for the nonvolatile memory. The data stored in the header can be used to facilitate the update process of FIG. 3.

Header 410 includes code usage indicator 420, an offset pointer to nonvolatile memory update tables 430, an offset pointer to nonvolatile memory erase procedures 440, an offset pointer to nonvolatile memory programming procedures 450, and an offset to an exit procedure 460.

Code usage indicator 420 is used by the update process in step 335 to determine whether protected procedures from the update file or the nonvolatile memory are to be used for the update process. Thus in one embodiment, FMUP reads the code usage indicator of the update file to determine whether the protected procedures should be copied from the nonvolatile memory or the update file.

Code usage indicator 420 can also indicate which portions of the update information are to be for this system. The code usage indicator permits using the same update information 470 for a variety of computer systems with each revision level. Thus either the identical update file can be used for a variety of computer systems, or the producer of the update file need only change the code usage indicator (and not the update information) for the various systems. This helps reduce the complexity in production and distribution of update files.

The offset pointers 430, 440, 450, and 460 are used when the protected procedures are copied from the update file instead of from the nonvolatile memory. The code usage indicator determines the source of the protected procedures to use for the current update. If the update file is the source of the protected procedures, the offset pointers provide the information necessary to locate the code for the protected procedures within the update file.

In particular, each offset pointer identifies the location of its associated procedure within update information 470 by indicating location measured from a predetermined reference point. Thus the value of each offset pointer indicates the relative location of its associated procedure with respect to the predetermined reference point. This predetermined reference point might be the beginning of the update file or the beginning of the update information section of the update file. Alternatively, the predetermined reference point might be the location of the offset pointer within the file so that the value of each offset pointer indicates the relative location of its associated protected procedure measured from the location of the offset pointer within the update file.

Consider, for example, the erase procedure. If the source of the erase procedure is the update file then the processor locates the erase procedure within the update information 470 using the offset pointer for the erase procedure 440. The located erase procedure is then copied to system memory for use during the update process.

Referring to step 340 of FIG. 3, the protected procedures copied from the nonvolatile memory included a pre-defined memory map for their associated logical areas. The protected procedures in the update file, however, may correspond to an updated nonvolatile memory mapping instead of the mapping currently defined for the nonvolatile memory. Therefore the update file includes a nonvolatile memory update table with an updated mapping of the nonvolatile memory. The nonvolatile memory update table is used when the protected procedures are copied from the update file in steps 335 and 355. Thus when copying protected procedures from the update file, steps 335 and 355 include copying the nonvolatile memory update table from the update file so that the updated memory map can be used with the protected procedures from the update file.

The updated memory map is particularly useful when the user desires to update the nonvolatile memory without regard to the current mapping of the nonvolatile memory. As described with respect to step 350 of FIG. 3, rather than explicitly selecting each of the logical areas to be updated, the user might implicitly select all the updatable logical areas for updating. This is particularly helpful when there is no longer a one-to-one correspondence between the logical areas before the update and the updated logical areas.

For example, the update file might provide for an upgrade having five logical areas instead of the four presented in the examples above. In such a case, rather than selecting which of the logical areas within the nonvolatile memory are to be replaced by the update information, the user may desire to update the nonvolatile memory to the five logical areas as defined in the update file. If this is the case, then referring to FIG. 3, all the updatable portions are selected in step 350 and the protected procedures (including the nonvolatile memory update table) are copied from the update file in step 355. This update process thus permits changes in the size and the number of logical areas within the nonvolatile memory. This update process also permits relocation the BIOS to areas other than its pre-update location within the nonvolatile memory.

Referring to FIG. 4, the update file includes an update table having an updated mapping for the nonvolatile memory. In one embodiment, the update table is stored in the update information section 470 of update file 400. Header 410 includes an offset pointer 430 to identify the location of the update table(s) within the update file. Offset pointer 430 is used to retrieve the update table when copying the protected procedures from the update file (steps 335 and 355 of FIG. 3). The update table can then used when programming the nonvolatile memory in steps 345 and 365 of FIG. 3.

Although not illustrated as a step in FIG. 3, once the programming of the nonvolatile memory is complete, the results of the update process can be displayed to the user on display device 150 (FIG. 1). If the update process requires a reboot, then the processor can be instructed to reboot. If a reboot is not necessary, then control can return to FMUP for other maintenance operations. A reboot may be necessary, for example, if the BIOS has been substantially modified or relocated within the nonvolatile memory.

FMUP can be stored as an executable file for the computer system and distributed independently from the update file.

By updating FMUP to incorporate the improved update process, older versions of BIOS (for example) can be updated to remove dependencies that constrain future updates to the BIOS. In general, the use of the improved nonvolatile memory update process helps to decrease the dependency of a future upgrade upon the current contents of the nonvolatile memory.

Furthermore, the use of the improved update process helps to reduce the need to provide a wide variety of update files for each version of BIOS in order to accommodate the variety of memory mappings for various computer systems. An FMUP incorporating the improved update process allows one update file format to be used for a variety of computer systems having incompatible memory mappings for their respective nonvolatile memories. In general, the improved update process helps to reduce the number of variations of an update file required to accommodate updating a variety of computer systems.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of updating a nonvolatile memory in a computer system, the method comprising:
   a) selecting a logical area of the nonvolatile memory to update;
   b) identifying protected procedures from one of the selected logical area and an update file;
   c) copying the identified protected procedures to a system memory for execution; and
   d) copying information from the update file to the nonvolatile memory in accordance with the protected procedures.

2. The method of claim 1 wherein the nonvolatile memory is a flash memory.

3. The method of claim 1 wherein the nonvolatile memory stores at least a portion of a basic input/output system (BIOS).

4. The method of claim 1 wherein copying protected procedures to system memory for execution further comprises:
   i) copying a nonvolatile memory update table from the update file, wherein the nonvolatile memory update table includes an updated mapping for the nonvolatile memory.

5. The method of claim 4 wherein the update file includes a header, the header including an offset pointer to the update table, wherein the update table is copied from a portion of the update file identified by the offset pointer.

6. The method of claim 1 wherein copying protected procedures to system memory for execution further comprises:
   i) copying an erase procedure from the update file.

7. The method of claim 6 wherein the update file includes a header, the header including an offset pointer to the erase procedure, wherein the erase procedure is copied from a portion of the update file identified by the offset pointer.

8. The method of claim 1 wherein copying protected procedures to system memory for execution further comprises:
   i) copying a programming procedure from the update file.

9. The method of claim 8 wherein the update file includes a header, the header including an offset pointer to the programming procedure, wherein the programming procedure is copied from a portion of the update file identified by the offset pointer.

10. The method of claim 1 wherein copying protected procedures to system memory for execution further comprises:
    i) copying an exit procedure from the update file.

11. The method of claim 10 wherein the update file includes a header, the header including an offset pointer to the exit procedure, wherein the exit procedure is copied from a portion of the update file identified by the offset pointer.

12. The method of claim 1 wherein the update file includes a header, the header including a code usage indicator, wherein the code usage indicator is used to select from one of the selected logical area and the update file as the source of the protected procedures.

13. The method of claim 1 wherein the update file includes a header, the header including a code usage indicator, wherein the code usage indicator is used to select from one of the selected logical area and the update file as the source for each of the protected procedures.

14. The method of claim 1 wherein the protected procedures include programming procedures and erase procedures for the selected logical area.

15. A method of updating a nonvolatile memory, the method comprising:
    a) providing an updated memory map for the nonvolatile memory;
    b) selecting at least a portion of the nonvolatile memory to update;
    c) identifying protected procedures from one of the nonvolatile memory and an update file;
    d) copying protected procedures to a system memory for execution; and
    e) copying information from the update file to the nonvolatile memory in accordance with the protected procedures.

16. The method of claim 15 wherein the nonvolatile memory is a flash memory.

17. The method of claim 15 wherein protected procedures remap the nonvolatile memory so that if there is a one-to-one correspondence between logical areas of the nonvolatile memory before and after remapping, then at least one logical area has a different size after remapping.

18. The method of claim 15 wherein the protected procedures remap the nonvolatile memory to vary a count of logical areas so that there is not a one-to-one correspondence between logical areas before and after remapping.

19. The method of claim 15 wherein providing an updated memory map for the nonvolatile memory further comprises:
    i) copying an updated memory map from the update file.

20. The method of claim 19 wherein the update file includes a header, the header including an offset pointer to the updated memory map, wherein the updated memory map is copied from a portion of the update file identified by the offset pointer.

21. The method of claim 15 wherein the update file includes a header, the header including a code usage indicator, wherein the code usage indicator indicates whether an updated memory map is provided from the update file.

22. A method of updating a nonvolatile memory in a computer system, the method comprising:
    a) selecting one or more logical areas as a selected section, if a selective update by logical area is selected;
    b) selecting one or more portions as a selected section, if the selective update by logical area is not selected;

c) identifying protected procedures from one of the nonvolatile memory and an update file;

d) copying protected procedures to a system memory for execution;

e) erasing the selected section of the nonvolatile memory;

f) copying update information from the update file to the nonvolatile memory in accordance with the protected procedures.

23. The method of claim 22 wherein the nonvolatile memory is a flash memory.

24. The method of claim 22 wherein the nonvolatile memory stores at least a portion of a basic input/output system (BIOS).

25. The method of claim 22 wherein copying protected procedures to system memory for execution further comprises:

i) copying an update table from the update file, wherein the update table includes an updated mapping for the nonvolatile memory.

26. The method of claim 25 wherein the update file includes a header, the header including an offset pointer to the update table, wherein the update table is copied from a portion of the update file identified by the offset pointer.

27. The method of claim 22 wherein copying protected procedures to system memory for execution further comprises:

i) copying an erase procedure from the update file.

28. The method of claim 27 wherein the update file includes a header, the header including an offset pointer to the erase procedure, wherein the erase procedure is copied from a portion of the update file identified by the offset pointer.

29. The method of claim 22 wherein copying protected procedures to system memory for execution further comprises:

i) copying a programming procedure from the update file.

30. The method of claim 29 wherein the update file includes a header, the header including an offset pointer to the programming procedure, wherein the programming procedure is copied from a portion of the update file identified by the offset pointer.

31. The method of claim 22 wherein copying protected procedures to system memory for execution further comprises:

i) copying an exit procedure from the update file.

32. The method of claim 31 wherein the update file includes a header, the header including an offset pointer to the exit procedure, wherein the exit procedure is copied from a portion of the update file identified by the offset pointer.

33. The method of claim 22 wherein the update file includes a header, the header including a code usage indicator, wherein the code usage indicator is used to select from one of the nonvolatile memory and the update file as the source of the protected procedures.

34. The method of claim 22 wherein the update file includes a header, the header including a code usage indicator, wherein the code usage indicator is used to select from one of the nonvolatile memory and the update file as the source for each of the protected procedures.

35. The method of claim 22 wherein copying protected procedures to system memory for execution comprises copying at least one of a programming procedure, an erase procedure, an exit procedure, and an update table having an updated memory map of the nonvolatile memory.

* * * * *